(12) United States Patent
Peles

(10) Patent No.: US 7,299,901 B2
(45) Date of Patent: Nov. 27, 2007

(54) ANTILOCK AND ANTISKID MECHANICAL BRAKE SYSTEM FOR VEHICLES AND METHOD THEREOF

(76) Inventor: Zalman Peles, Cfar Corazim, M.P., Corazim 12391 (IL)

( * ) Notice: Subject to any disclaimer, the term of this patent is extended or adjusted under 35 U.S.C. 154(b) by 157 days.

(21) Appl. No.: 10/992,949

(22) Filed: Nov. 22, 2004

(65) Prior Publication Data

US 2005/0205363 A1    Sep. 22, 2005

(51) Int. Cl.
*B62L 1/02*      (2006.01)
(52) U.S. Cl. .................................. 188/24.12
(58) Field of Classification Search ... 188/24.12–24.22
See application file for complete search history.

(56) References Cited

U.S. PATENT DOCUMENTS

| | | | | |
|---|---|---|---|---|
| 2,460,204 | A | * | 1/1949 | Vacher ..................... 188/24.21 |
| 3,993,174 | A | | 11/1976 | Williams et al. |
| 4,351,418 | A | | 9/1982 | Woodring et al. |
| 4,585,094 | A | | 4/1986 | Rottenkolber et al. |
| 4,773,509 | A | | 9/1988 | Sato |
| 4,823,915 | A | | 4/1989 | Nagano |
| 4,862,999 | A | | 9/1989 | Rakover |
| D340,024 | S | | 10/1993 | Passmore |
| 5,503,253 | A | * | 4/1996 | Li ............................. 188/24.12 |
| 5,562,185 | A | * | 10/1996 | Chen ......................... 188/24.12 |
| 5,566,789 | A | | 10/1996 | Allen |
| 5,626,209 | A | * | 5/1997 | Viola ....................... 188/24.14 |
| 5,634,533 | A | | 6/1997 | Zago |
| 5,730,256 | A | | 3/1998 | Namngani |
| 5,813,501 | A | | 9/1998 | Terry, Sr. |
| 5,913,386 | A | | 6/1999 | Chen et al. |
| 5,913,388 | A | | 6/1999 | Ota et al. |
| 6,109,397 | A | | 8/2000 | Chen |
| 6,152,266 | A | | 11/2000 | Takizawa |
| 6,155,383 | A | | 12/2000 | Sugimoto |
| 6,786,308 | B1 | * | 9/2004 | Huang ...................... 188/24.12 |

FOREIGN PATENT DOCUMENTS

| | | |
|---|---|---|
| EP | 0861769 | 9/1998 |
| EP | 0949133 A2 | 3/1999 |
| FR | 2730690 | 8/1996 |

* cited by examiner

*Primary Examiner*—Christopher P. Schwartz
(74) *Attorney, Agent, or Firm*—AlphaPatent Associates Ltd.; Daniel J. Swirsky

(57) ABSTRACT

The present invention discloses a mechanical brake system for decelerating or ending the rotation of a wheel of a vehicle, adapted to eliminate the friction of the brakes with said decelerated wheel in the manner that the braking force is mechanically provided to be lower than the torque force of said wheel so that the locking of the wheel is prevented and the vehicle skid is eliminated. Moreover, a method of preventing a vehicle from skidding and/or for avoiding said vehicle's wheel from locking comprising applying the aforesaid braking system is also disclosed.

7 Claims, 10 Drawing Sheets

ANTILOCK AND ANTISKID MECHANICAL BRAKE SYSTEM FOR VEHICLES AND METHOD THEREOF

FIELD OF THE INVENTION

The present invention generally relates to a method and an antilock and antiskid mechanical brake system for vehicles.

BACKGROUND OF THE INVENTION

Many brakes systems, especially adapted for bicycles and motorcycles were introduced in the literature. Some of them are approaching various mechanisms and techniques adapted to avoid lock of the decelerated wheel and hence to eliminate skidding of the bicycles at acute stop.

Brake systems that are merely improvements of the commercially available products are constantly suggested. Hence, U.S. Pat. No. 6,155,383 to Sugimoto and U.S. Pat. No. 5,913,388 to Katsuyuki et al., both of Shimano Inc. discloses mechanical facilitated brakes systems for bicycles. On the other hand, U.S. Pat. No. 5,730,256 to Abdulatif teaches a complicated mechanical antilock braking system for intermittently releasing pressure applied by a brake shoe to a wheel being decelerated. It is a fragile, heavy weight and complex system, based only on the velocity of the vehicle, which is not suitable for mass production and for being utilized in mountain or sport bicycles. A cost-effective antilock and antiskid mechanical brake system for bicycles, light weighted, which is adapted for every day use thus meets a long felt need.

SUMMARY OF THE INVENTION

It is thus the object of the present invention to provide an antilock and antiskid mechanical brake system for vehicle (e.g., bicycles, motor bicycles or cars). In case of bicycles for example in a non-limiting manner, said system comprising a simple and reliable everlasting system adjustable for any bicycle type, size or designations (e.g., mountain, sport or road bicycles).

It is in the scope of the present invention wherein a mechanical brake system for decelerating or ending the rotation of a wheel of a vehicle is provided. The system is adapted to eliminate the friction of the brakes with said decelerated wheel in the manner that the braking force is mechanically provided to be lower than the torque force of said wheel so that the locking of the wheel is prevented and the vehicle skid is eliminated.

It is further in the scope of the present invention wherein the brake system comprising a lock assembly and retracting mechanism. The a lock assembly comprising a plurality of vice grip brake arms having a brake pad ends adapted to fasten said wheel rim by a perpendicular maneuver; a common hinge at the central portion of each arm, adapted to be entrapped by a main retracting axle, a arm neck portion and arm clip end, each is in communication with a steel brake cable. The retracting mechanism; comprising a spring assembly; comprising said elongated axle which is parallel to said wheel, said axle is having a proximal portion and distal portion; said proximal portion is anchored to said bicycles' driving fork; said vice grip brake arms common hinge being continuously pushed towards the said proximal end by means of a spring member which is entrapped along said main retracting axel; and a fastening clip screwed to the distal end of the retracting axle so that by rotating said clip inwards toward the proximal portion of the axle, the said spring member is twisted; and a housing assembly; comprising a cylinder; comprising a rigid housing adapted to accommodate said spring assembly; and a restricting wing-like member in physical communication with said vice grip brake arms. The vice grip brake arms are having two subsequent maneuvers: a lateral (perpendicular to said wheel) clasping movement so that by pulling said steel brake cable said arms are maneuvered to clasp said wheel rim up to a predetermined measure in the manner the wheel rotation is decelerated or ended; and a longitudinal movement (parallel to said wheel) provided only at a predetermined and elevated torque moment of said decelerated wheel in the manner said neck portion of the brake arms, being clasped to said wheel, are enforced to slide towards said restricting wing-like member forwardly against said spring member resistance, and simultaneously said vice grip brake are forced to open their arm up to a predetermined measure so that their lock is avoided and further so the said bicycle's skid and/or wheel locking is prevented. It is acknowledged in this respect that the wings of the said restricting wing-like member are vertical and/or horizontal.

A second object is to provide a cost effective method of preventing a vehicle from skidding and/or for avoiding said vehicle's wheel from locking comprising applying a braking system as defined in any of the above.

It is lastly in the scope of the present invention wherein a method of decelerating or ending of the rotation of a loaded wheel of a vehicle is provided useful. This method comprising at least one step of applying a braking force which is lower than the torque force of said wheel so that the locking of the wheel is prevented and the vehicle skid is eliminated; wherein the braking force depends on the condition of the road according to the equation of $F=HD/R$.

BRIEF DESCRIPTION OF THE FIGURES

In order to understand the invention and to see how it may be implemented in practice, a plurality of preferred embodiments will now be described, by way of non-limiting example only, with reference to the accompanying drawing, in which FIG. 1 schematically presents a general perspective view of the brake system according to one embodiment of the present invention, characterized by a vertical wing-like members and vice grip brake arms have an upper hinge.

DETAILED DESCRIPTION OF THE INVENTION

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide an antilock and antiskid mechanical brake system for bicycles and motorcycles.

The term 'vehicle' generally refers in the present invention to any bicycles (especially sport and mountain bicycles), tandem, wagons, carts, motorcycles; motorbikes and their like; and also to any vehicle or car characterized by at least one rotating loaded wheel to be occasionally stop or decelerate in a controllable manner.

The term "spring member" refers in the present invention to any spring, helix or other spring-like members; springs assembly (e.g., a clockwise coiled spring enveloping a narrower counter-clockwise coiled spring, a plurality of parallel springs etc), hydraulic brake mechanism, a piston in a compressed liquid system etc According to one embodiment of the present invention, an antilock and antiskid mechanical brake system is provided useful. This system is especially useful for decelerating or ending the rotation of a wheel of bicycles and other vehicle as defined above. The brake system is inter alia comprised of a lock assembly and a retracting mechanism, a torque mechanism, a hydraulic brake mechanism or any combination thereof.

Figure 1:
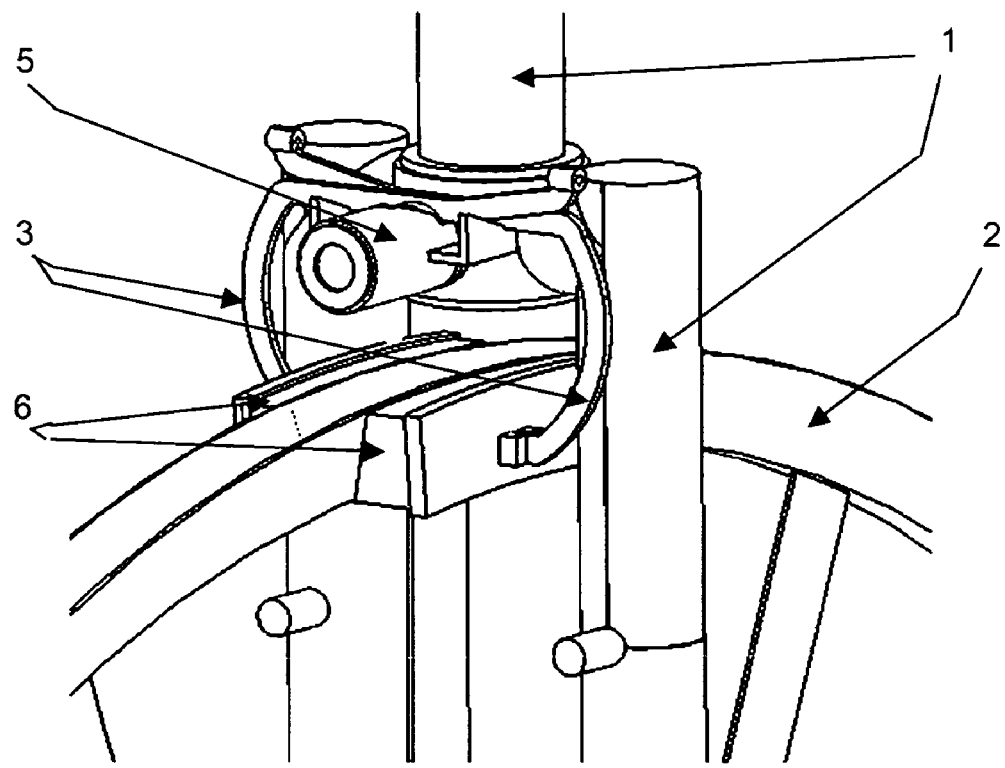

Reference is made now to FIG. 1, presenting a schematic and generalized presentation of the aforementioned novel antilock and antiskid mechanical brake system adapted to the front driving fork (1) of typical bicycles. Front wheel (2) is decelerated in a controlled fashion by a means of a lock assembly comprising two bended and curved vice grip brake arms (3) having two opposite standing brake pads (6) in the manner that retracting mechanism (5) are restricting the upper neck portion of the arm by vertical restricting wing-like member.

Figure 2:
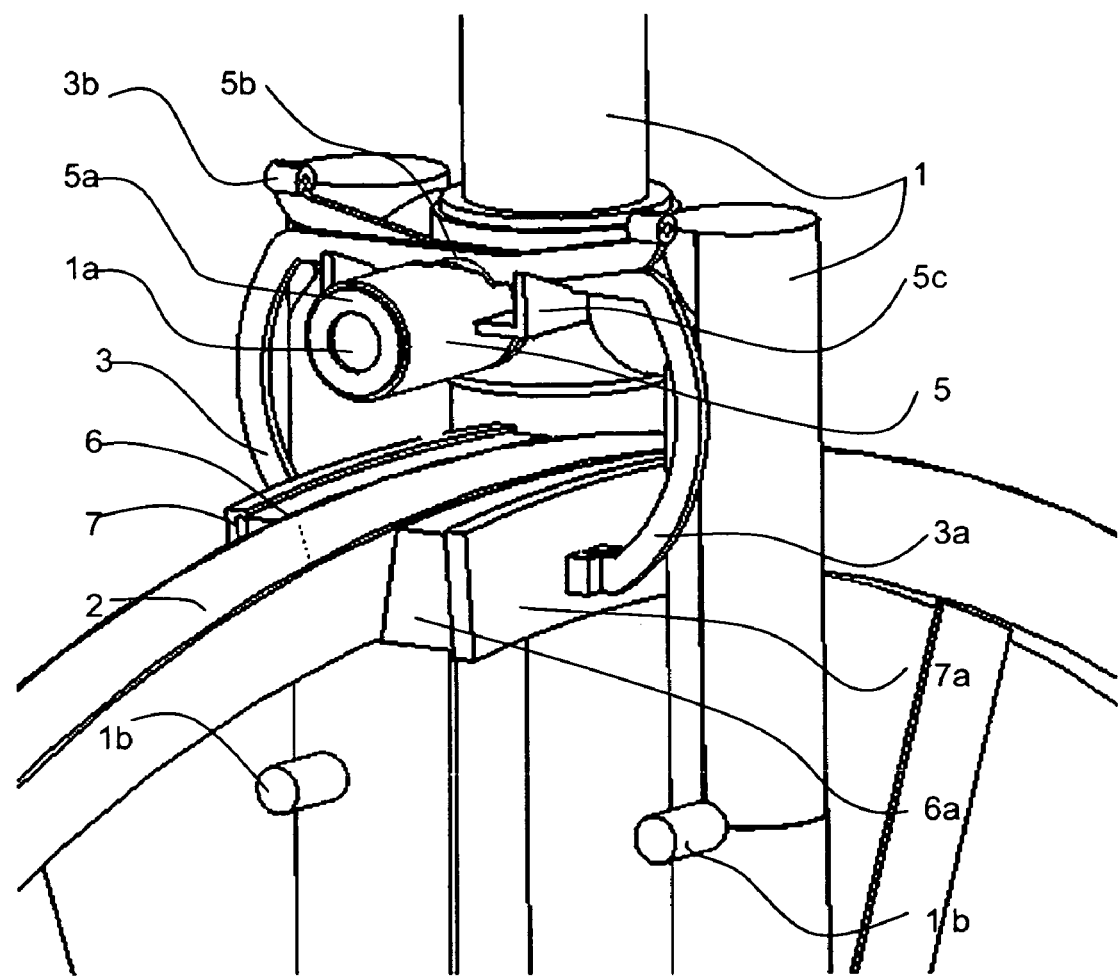
FIG. 2 schematically presents a detailed description of the same.

Reference is made now to FIG. 2. The lock assembly is inter alia comprised of a plurality of vice grip brake arms, normally two such arms, having a rubber-made brake pad ends (6, 6a) usually incorporated on metal sandals (7a). Those pads are adapted to be fastened and to clasp the metallic rim of the wheel (2) by a perpendicular maneuver. Those arms further consisting of a common hinge (not shown here) located approximately at the central portion of each arm. The hinge is adapted to be entrapped by a main retracting axle (1a). Commercially available arms are characterize by a hinge containing an open bore, said bore adapted to fit said retracting axle by size and shape. Each of the vice grip brake arms (3, 3a) is also consisting by arm-neck portion and is ended by clip end (3b), which is in communication with an endless steel brake cable (not shown) operated by the rider of the bicycle.

Figure 3:
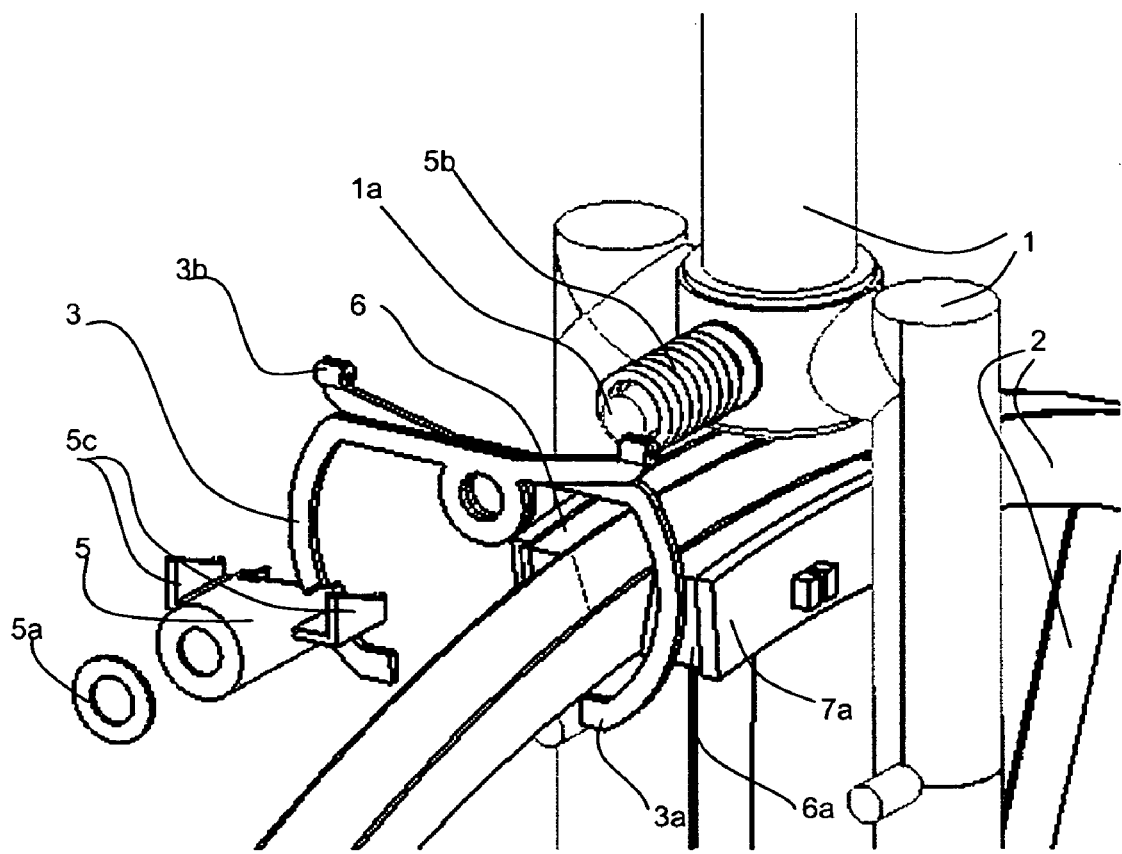
FIG. 3 and FIG. 4 schematically presents a disassembled look and a partial disassembled look, respectively, of the same.

Reference is made now to FIG. 3. The retracting mechanism is inter alia comprised of a spring assembly and a housing assembly. The retracting mechanism includes said elongated axle (1a), which is oriented in parallel to wheel (2). The axle is having a proximal portion and distal portion directed to the front. The proximal portion is anchored to the bicycles' driving fork (1) or any suitable portion of the vehicle (e.g., the front or rear fork of the bicycle or a vehicle body). The aforesaid vice grip brake arms common hinge (3d) is entrapped by the axle and is continuously pushed towards the said proximal end of the axle by means of a spring member (5b). A fastening clip (5a) is screwed at the distal end of the retracting axle so that by rotating said clip inwards (i.e., toward the proximal portion of the axle), the spring member is twisted so any suitable resistance is obtained.

The housing assembly is comprised of a cylinder (5); characterized by both a rigid housing adapted to accommodate said spring assembly; and a restricting wing-like member (5c, here a vertical wing). This wing-like member (5c) is oriented in a manner that it is either in a physical communication with or adjacent to the aforesaid neck portion (3e) of the vice grip brake arms (3).

It is hence according to one embodiment of the present invention, wherein the hereto defined vice grip brake arms (and especially their neck-like portion) of the antilock and antiskid mechanical brake system are having two subsequent maneuvers: a lateral clasping maneuver followed by a longitudinal maneuver.

The lateral clasping movement is perpendicular to the wheel to be decelerated so that by pulling the steel brake cable, the arms are maneuvered to clasp the wheel rim tightly up to a predetermined measure, aimed to create friction in order to bring the wheel into a complete stop, thus, sometimes the wheel stops before the bicycle does and the bicycle and rider moves forcefully forward by the last direction of the bicycle movement with no ability to steer the wheel.

Then, a conditioned longitudinal movement is provided by the brake arms (3) and (3a). This maneuver is directed in parallel to the wheel (2) and is subsisted only at a predetermined and elevated torque moment wherein the decelerated wheel is powerfully tourqing and the clasped brake arms to the point of locking the wheel. The arms are enforced to slide (on a sloping plane) towards the vertical restricting wing-like member forwardly, against the aforesaid spring member resistance. Simultaneously the vice grip brake are forced by the vertical wing-like member to to travel on the said sloping plane of the wings, thus, open (or spread) their arms up to a predetermined measure so that their lock on the still spinning wheel is avoided, and further so the said bicycle's dangerous skid is prevented.

Figure 4:
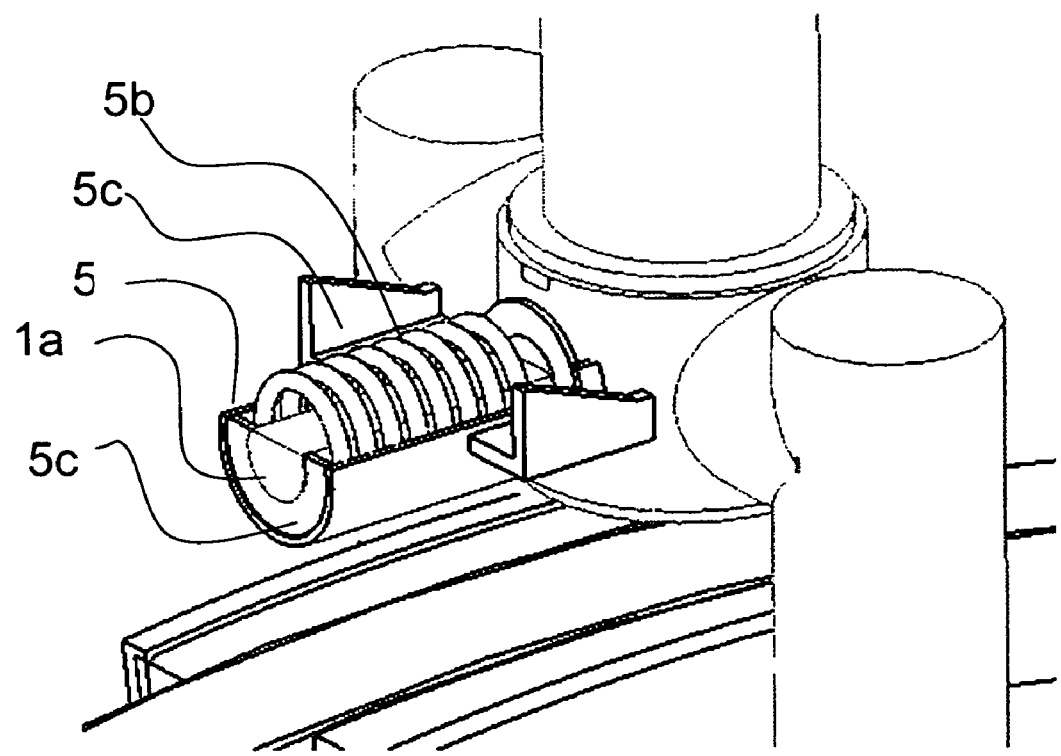
Figure 5:
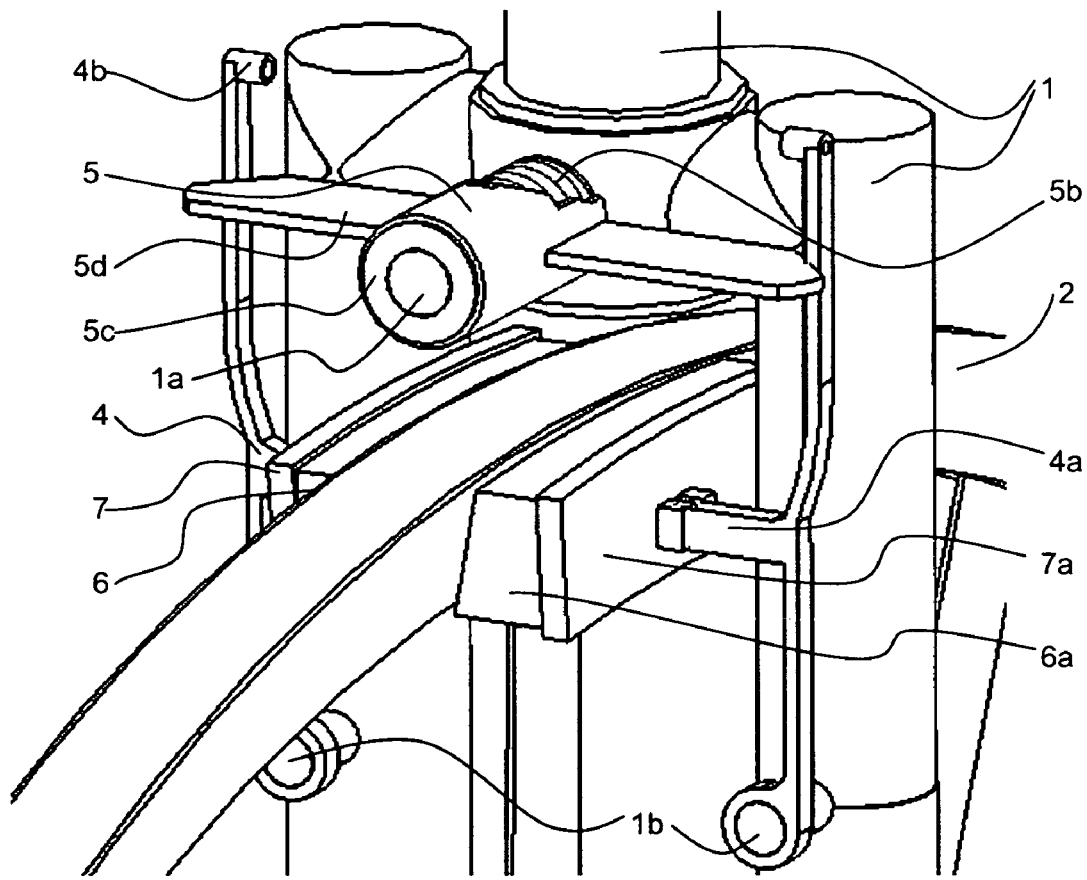
FIG. 5 is a schematic view of a brake system according to another preferred embodiment of the present invention, characterized by having horizontal wing-like members.

Reference is made thus now to FIG. 4, presenting yet another embodiment of the present invention wherein the wings of the said restricting wing-like member are horizontal. According to this embodiment, the novel antilock and antiskid mechanical brake system is adapted to the front driving fork (1) of typical bicycles. Front wheel (2) is decelerated in a controlled fashion by a means of a lock assembly comprising two elongated, straight and erected vice grip brake arms (4) having two opposite standing brake pads (6a) entrapped by rectangle members (4, 4a) in the manner that retracting mechanism (5) are restricting the upper neck portion of the arm (41) by the horizontal restricting wing-like member (5d). The lower end of brake arms (3) are rotetably clasp to driving fork (1) by means of horizontal pins (such a 1b).

Figure 6:
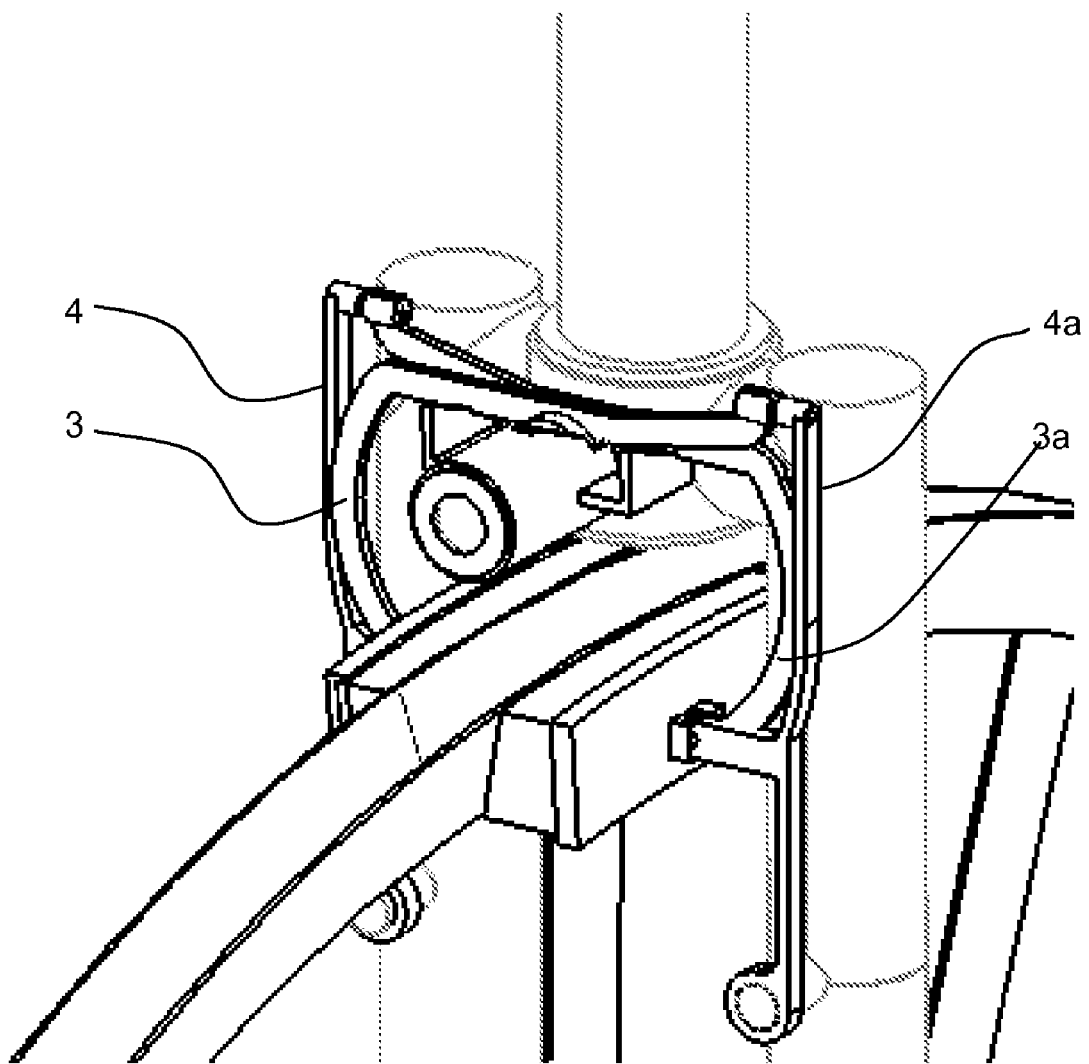
FIG. 6 schematically presents a general perspective view of the brake system according to yet another preferred embodiment of the present invention, characterized by vertical wing-like members and vice grip brake arms having a plurality of lower hinges.

Reference is made now to FIG. 6, showing the aforesaid horizontal wing assembly, wherein at least three of horizontal pins (1a, 1b, and 1c- not shown) are exceeded from the driving fork (1). Main restricting axle (1a) is enforcing the restricting mechanism, comprising spring member (5b), cylinder (5b), horizontal wing-like members (5d), clip (5c)

etc. The vice grip brake arms (4) comprising and erected portion (4a) ended with a upper clip tip (4b) adapted to be in communication with an endless steel brake cable (not shown), wherein the lower end is a rotatable hinge accommodate to the driving fork (1) by a means of vertical pins (1a, 1b), By pulling aforesaid brake cable, arms (4a, 4b) are rotate perpendicularly to the wheel (2) and hence decelerating its spinning. Then, a conditioned longitudinal movement is provided. This maneuver is directed in parallel to the wheel (2) and is subsisted only at a predetermined and elevated torque moment wherein the arms are enforced to slide towards the restricting wing-like members (5d) forwardly, against spring member (5b) resistance. Simultaneously the vice grip brake are forced by the horizontal wing-like member to open their arms up to a predetermined measure so that their lock on the still spinning wheel is avoided, and further so the said bicycle's dangerous skid is prevented.

Figure 7:
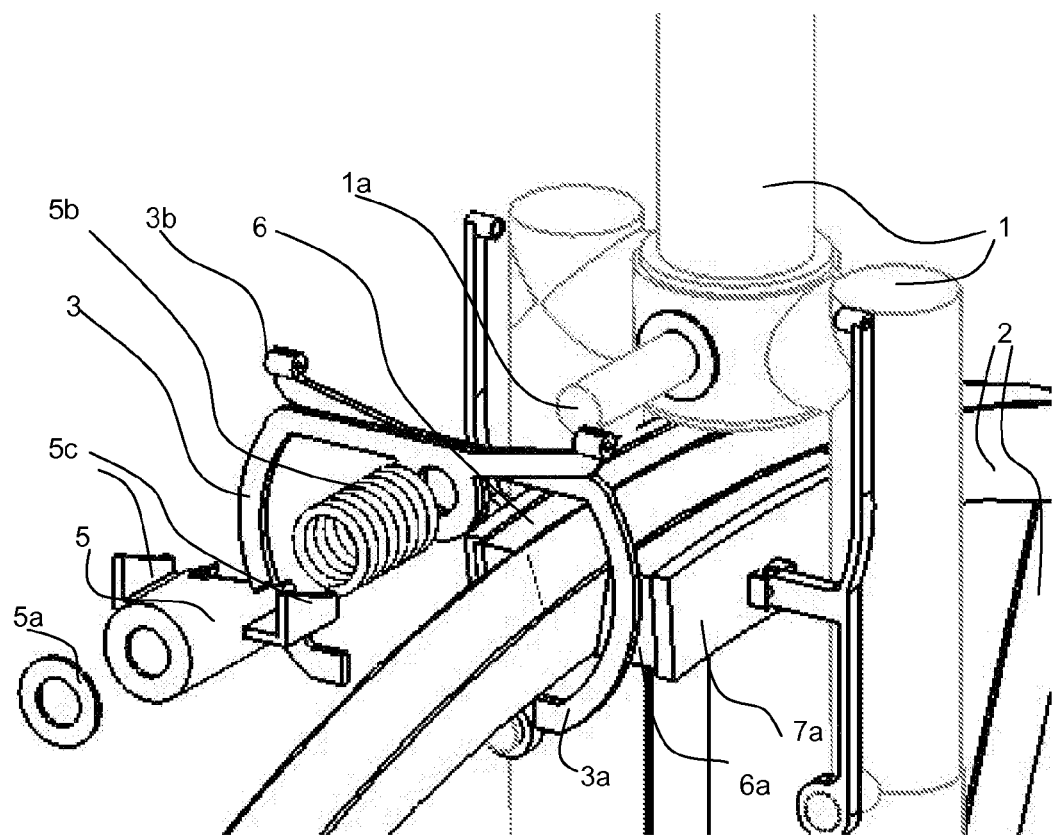
FIG. 7 schematically presents a general perspective view of the brake system according to yet another preferred embodiment of the present invention, characterized by a winger master cylinder operating a pair of pistons that is connected to the vice grip brake arms.

Reference is made now to FIG. 6 and FIG. 7 above, presenting a third embodiment of the present invention which combined the two above mentioned embodiments, and accordingly comprising a vertical wing-like members in communication with vice grip brake arms (4) comprising and erected portion and curved portion (3), further having a set o two lower hinges immobilized on each of the driving fork's arms. FIG. 7 is presenting a disassembled view of the same.

Figure 8:
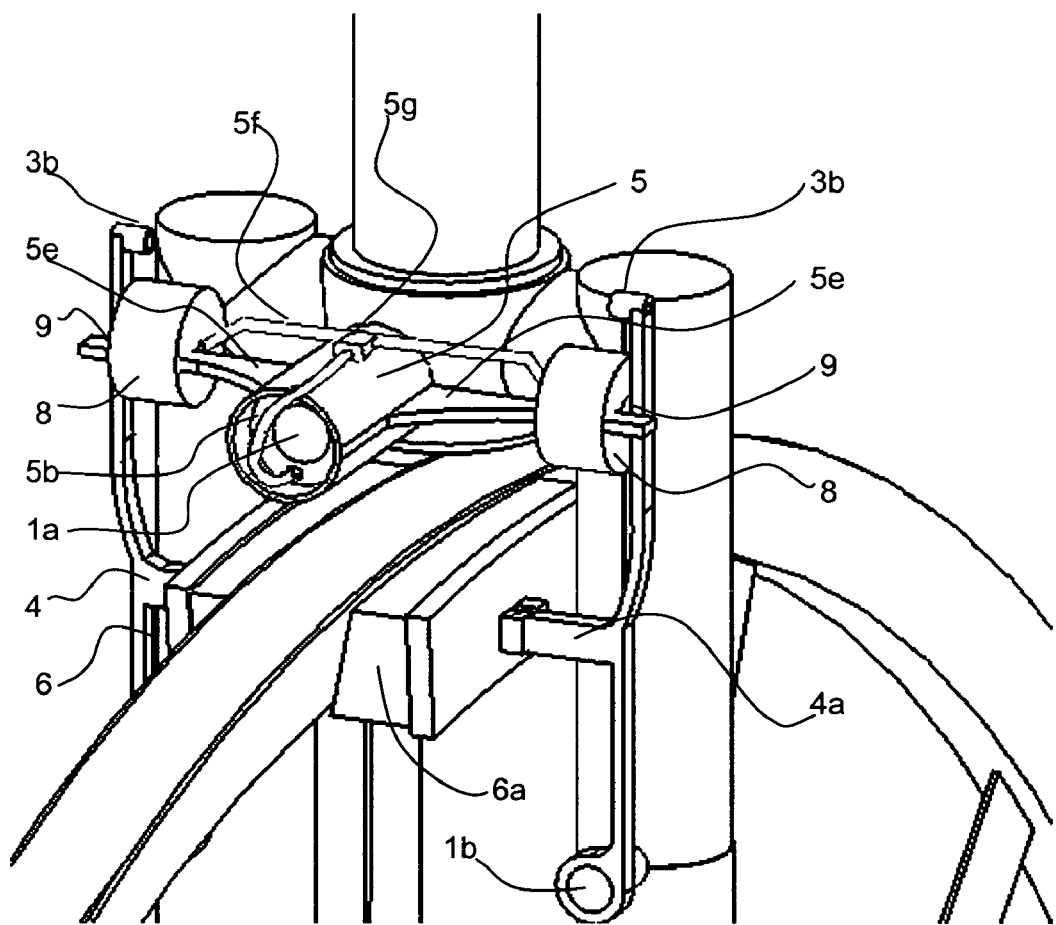
FIG. 8 schematically presents a general perspective view of an hydraulic brake system.
Figure 9:
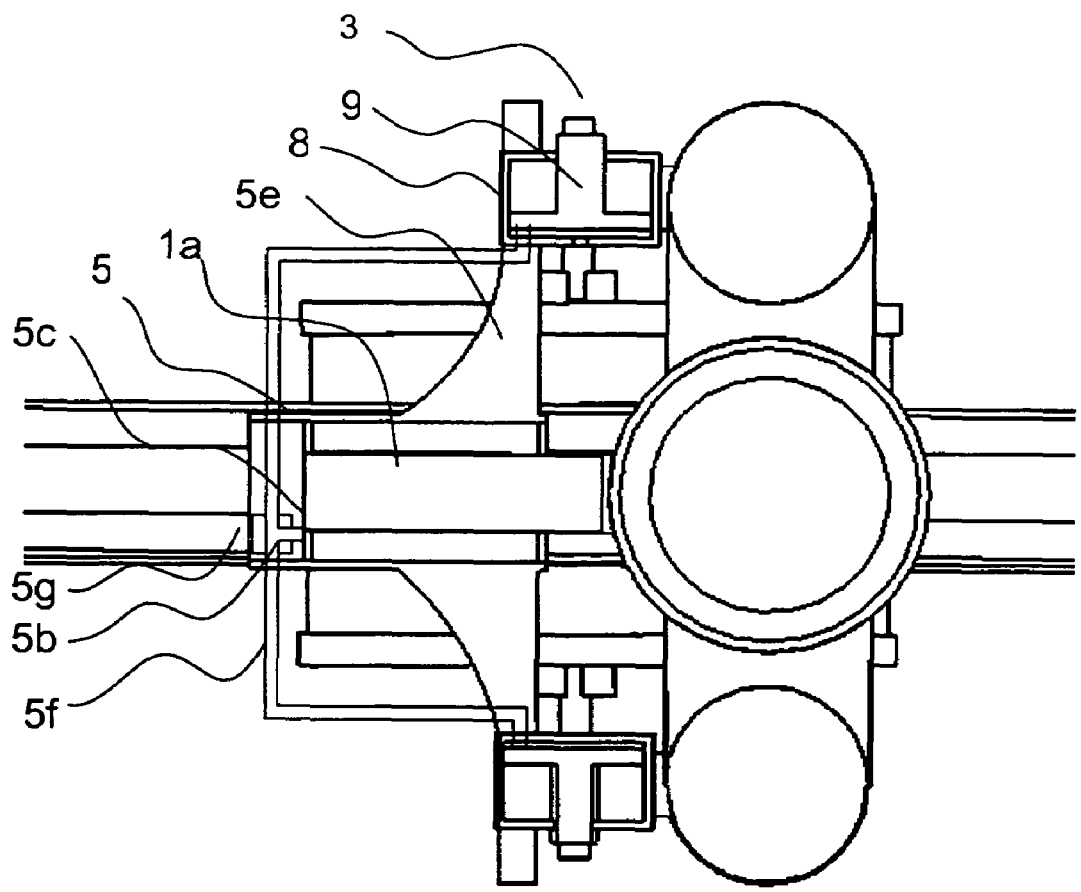
FIG. 9 schematically presents a cross section of the same.

FIG. 8 is presenting a brakes system comprising a hydraulic mechanism comprising main axle (1a), main brake fluid pipe (5b), lock release cylinder (8), secondary brake fluid pipes (5f) in communication with the main brake fluid pipe (5b) via one branching module, and lock release pistol (9); wherein FIG. 9 is presenting a cross section of the same.

Figure 10:
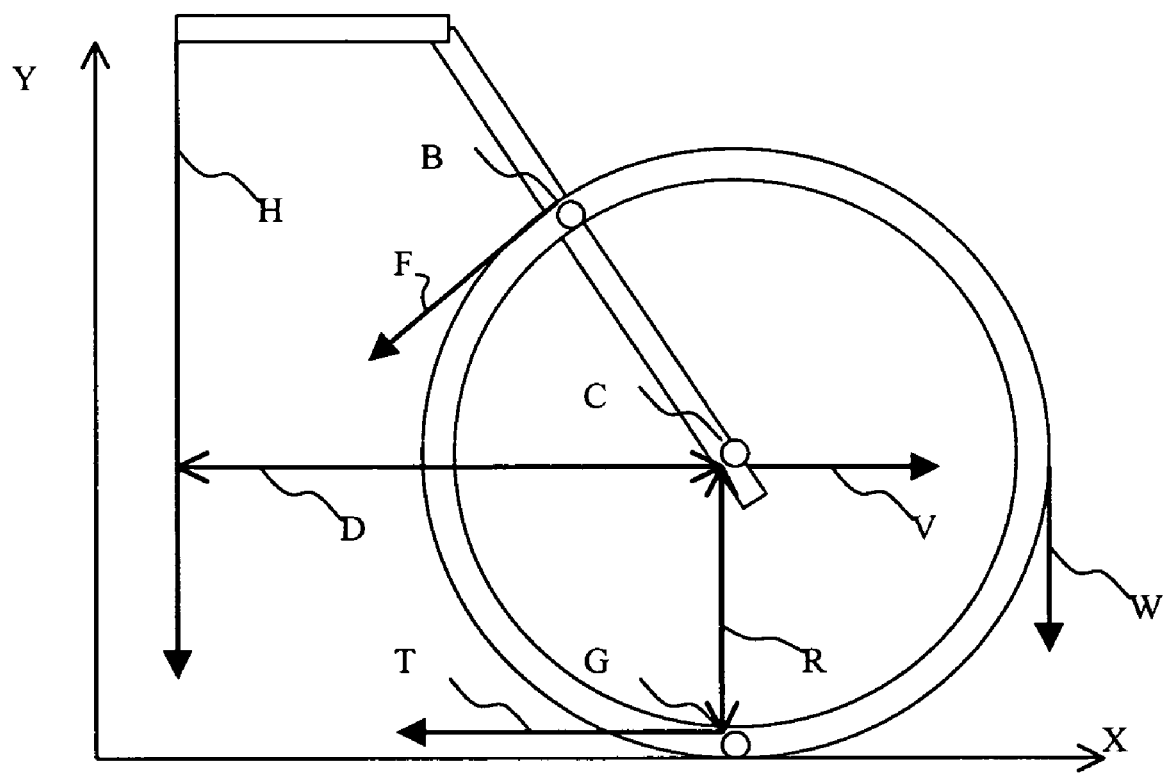
FIG. 10 schematically illustrates the decelerated wheel and the forces thereupon.

Reference is made now to FIG. 10 presenting a schematic view of a wheel to be decelerated. The wheel is centered at point C and touches the ground at point G. The distance between C and G is the radius of the wheel R. A break is applied at point B, roughly at a distance R from center C. We hereby assume that the distance between B and G is exactly R, for ease of presentation.

The wheel rotates clockwise, at angular velocity W, and moved along axis X in velocity V. Gravity acts perpendicular to X against axis Y.

The wheel is connected to bicycles at its center C. The center of gravity of the bicycle is located at distance D from C along the X direction. The weight of the bicycles is H, including rider, payload, etc.

Let us calculate the force F at the break and at a certain critical instant in which the wheel has just stopped rotating due to the action of the break, W=0, but the bicycle are still moving, V>0, so that the ground drags it by a force T acting to stop the motion.

The bicycles may over-turn when force T extends too high a torque. Calculating at point C, T extends a torque of T times R, or TR. This torque is balanced by the torque extended by weight H, which is HD. The condition for the bicycles not to over-turn is TR<HD, and TR=HD at the limit.

Looking at the wheel, net of the rest of the bicycles, when it is stopped from turning, the balance of torques at point C dictates FR=TR or F=T.

Therefore we have: HD=TR=FR, or $F=HD/R.$

In conclusion, the greatest force the break must extend, without fear of over-turning the bicycles is proportional to the weight of the bicycles, including rider, payload, etc., it is proportional to the length from wheel to center of mass, and it is inversely proportional to the radius of the wheel.

When the wheel is turning, W>0, and the break is applied, and assuming the wheel is lightweight and has no moment of inertia, and if traction force T vanishes briefly, as it happens over a patch of slippery ground, then the force of the break F instantly locks the wheel, regardless of its magnitude. Therefore, the critical force to prevent the wheel from locking depends on the condition of the road.

What is claimed is:

1. An anti-lock brake mechanism for use with a bicycle, said bicycle including a brake having a pair of brake shoes and a brake arm coupled to each of said brake shoes, the mechanism comprising;
   (a) a spring positioned inside of a spring housing, and;
   (b) first and second wing-like members extending from either side of said spring housing, wherein said first and second wing-like members each comprise a sloped edge;
   wherein each of said sloped edges of said wing-like members are adapted for contacting the upper portion of one of said brake arms of said bicycle, such that when there is an application of an excessive braking force, resulting in the forward movement of the brake shoes along with the corresponding wheel of said bicycle, said forward movement of said brake shoes causes said upper portion of said brake arms to move along said sloped edges of said wing-like members, thereby causing the outward movement of the brake arms and the associated brake pads away from the wheel, so as to prevent locking or skidding of bicycle.

2. An anti-lock brake mechanism according to claim 1, for use with a bicycle having leverage-arm brakes.

3. An anti-lock brake mechanism according to claim 2, wherein the wing-like members are horizontal.

4. An anti-lock brake mechanism according to claim 2, wherein each brake arm comprises a swivel axle for facilitating movement of said arm.

5. An anti-lock brake mechanism according to claim 1, for use with a bicycle having vice-grip arm brakes.

6. An anti-lock brake mechanism according to claim 5, wherein the wing-like members are partially vertically oriented.

7. An anti-lock brake mechanism according to claim 1, for use with a bicycle having hydraulic powered brakes.

* * * * *